(12) United States Patent
Ziv et al.

(10) Patent No.: US 12,423,158 B2
(45) Date of Patent: Sep. 23, 2025

(54) SYSTEM AND METHOD FOR PROVISIONING OF ARTIFICIAL INTELLIGENCE ACCELERATOR (AIA) RESOURCES

(71) Applicant: SolidRun Ltd., Yokneam Illit (IL)

(72) Inventors: Atai Ziv, Matan (IL); Rabeeh Khoury, Tarshisha (IL); Kossay Omary, Nazareth (IL); Avi Levy, Yokneam Illit (IL)

(73) Assignee: SolidRun Ltd., Yokneam Illit (IL)

( * ) Notice: Subject to any disclaimer, the term of this patent is extended or adjusted under 35 U.S.C. 154(b) by 1089 days.

(21) Appl. No.: 17/026,911

(22) Filed: Sep. 21, 2020

(65) Prior Publication Data

US 2021/0004658 A1    Jan. 7, 2021

Related U.S. Application Data

(63) Continuation-in-part of application No. 16/886,303, filed on May 28, 2020, now abandoned, which is a continuation-in-part of application No. 16/090,250, filed as application No. PCT/IL2017/050396 on Mar. 30, 2017, now abandoned.

(60) Provisional application No. 62/902,440, filed on Sep. 19, 2019, provisional application No. 62/853,346, filed on May 28, 2019, provisional application No. 62/316,048, filed on Mar. 31, 2016.

(51) Int. Cl.
G06F 9/50    (2006.01)
G06N 3/04    (2023.01)
G06N 3/08    (2023.01)

(52) U.S. Cl.
CPC .......... *G06F 9/5055* (2013.01); *G06F 9/5066* (2013.01); *G06F 2209/501* (2013.01); *G06F 2209/5011* (2013.01); *G06F 2209/5017* (2013.01); *G06F 2209/503* (2013.01); *G06N 3/04* (2013.01); *G06N 3/08* (2013.01)

(58) Field of Classification Search
None
See application file for complete search history.

(56) References Cited

U.S. PATENT DOCUMENTS 5,784,636 A * 7/1998 Rupp ................. G06F 15/8015
                                                    712/43
6,018,785 A * 1/2000 Wenniger ................ G06F 9/52
                                                    710/262

(Continued)

FOREIGN PATENT DOCUMENTS

WO    2017168427 A1    10/2017

OTHER PUBLICATIONS

International Search Report and Written Opinion of International Searching Authority for PCT/IL2017/050396, ISA/RU, Moscow, Russia, Dated: Jul. 23, 2017.

*Primary Examiner* — Adam Lee
(74) *Attorney, Agent, or Firm* — M&B IP Analysts, LLC

(57) ABSTRACT

A neural processing unit (NPU) includes a network interface controller (NIC) connected to at least one client device over a network fabric in a manner such that the network interface controller can receive instructions from at least one client device. The NPU further includes an artificial intelligence accelerator (AIA) connected to the network interface controller, the AIA being arranged to receive instructions from the NIC and execute the received instructions.

20 Claims, 6 Drawing Sheets

(56) References Cited

U.S. PATENT DOCUMENTS

| | | |
|---|---|---|
| 6,856,601 B1* | 2/2005 | Bell .................... H04L 12/6418 370/252 |
| 7,526,558 B1* | 4/2009 | Pittman ............... H04L 67/1097 709/227 |
| 8,587,945 B1 | 11/2013 | Hartmann et al. |
| 9,507,736 B2* | 11/2016 | Shah ...................... H04L 41/04 |
| 9,602,437 B1* | 3/2017 | Bernath ............. H04L 49/9084 |
| 9,658,983 B1* | 5/2017 | Barber ................ G06F 16/2474 |
| 9,864,701 B1* | 1/2018 | Khan .................. G06F 12/0292 |
| 9,881,258 B1* | 1/2018 | Mopuru ................. G06Q 10/00 |
| 2002/0059078 A1* | 5/2002 | Valdes ................ H04L 41/0631 705/1.1 |
| 2003/0005100 A1* | 1/2003 | Barnard ................. H04L 41/12 709/227 |
| 2003/0028642 A1* | 2/2003 | Agarwal ................ H04L 67/53 709/224 |
| 2005/0039884 A1 | 2/2005 | Pawlenko et al. |
| 2005/0114520 A1* | 5/2005 | White ................ H04L 63/0209 709/228 |
| 2006/0031888 A1* | 2/2006 | Sparrell ............. H04L 12/2821 725/78 |
| 2006/0137009 A1* | 6/2006 | Chesla .................. G06F 21/552 726/22 |
| 2006/0187640 A1 | 8/2006 | Tomioka et al. |
| 2006/0218362 A1* | 9/2006 | McManis ................ H04L 12/44 711/162 |
| 2007/0006237 A1* | 1/2007 | Ghanaie-Sichanie ........................ G06F 9/546 719/328 |
| 2007/0094481 A1* | 4/2007 | Snook ..................... G06N 3/063 712/200 |
| 2007/0133171 A1 | 6/2007 | Cheon |
| 2007/0162300 A1* | 7/2007 | Roever .................. G06Q 30/06 705/902 |
| 2007/0226344 A1* | 9/2007 | Sparrell ............. H04L 41/0896 709/226 |
| 2007/0239964 A1* | 10/2007 | Denault ............. G06F 15/7867 712/11 |
| 2007/0294337 A1* | 12/2007 | Gaos ........................ H04L 67/14 709/203 |
| 2007/0297136 A1 | 12/2007 | Konshak |
| 2008/0105412 A1 | 5/2008 | Carlsen et al. |
| 2008/0216991 A1 | 9/2008 | Oikawa |
| 2009/0022091 A1* | 1/2009 | Buer ..................... H04W 72/23 370/328 |
| 2009/0022092 A1* | 1/2009 | MacInnis ................ H04W 4/02 370/328 |
| 2009/0022117 A1* | 1/2009 | Quigley ............... H04W 84/18 370/338 |
| 2009/0071625 A1 | 3/2009 | Lyon |
| 2009/0213127 A1* | 8/2009 | Krishnamurthy ..... G06F 9/5061 345/503 |
| 2010/0319981 A1 | 12/2010 | Kapusta et al. |
| 2011/0161972 A1* | 6/2011 | Dillenberger ............ G06F 9/52 718/104 |
| 2011/0173626 A1* | 7/2011 | Chi ..................... G06Q 10/0631 718/103 |
| 2011/0213712 A1* | 9/2011 | Hadar ................. G06Q 30/04 705/34 |
| 2011/0289034 A1* | 11/2011 | Palmer .................... G06N 3/06 706/26 |
| 2012/0033661 A1* | 2/2012 | Knappe ............... H04L 65/1053 370/352 |
| 2012/0101968 A1* | 4/2012 | Banerjee ............. H04L 41/0823 709/224 |
| 2012/0291997 A1 | 11/2012 | Chen et al. |
| 2013/0031334 A1* | 1/2013 | El-Essawy ............. H04L 45/02 712/30 |
| 2013/0050954 A1 | 2/2013 | Albrecht et al. |
| 2013/0138796 A1* | 5/2013 | Nicholson ............... H04L 67/51 709/224 |
| 2013/0208421 A1 | 8/2013 | Chester et al. |
| 2014/0029193 A1 | 1/2014 | Alshinnawi et al. |
| 2014/0086487 A1* | 3/2014 | Hao ........................ G06V 20/10 382/173 |
| 2014/0124174 A1 | 5/2014 | Campbell et al. |
| 2014/0133093 A1 | 5/2014 | Cox et al. |
| 2014/0189680 A1* | 7/2014 | Kripalani .................. G06F 8/65 717/176 |
| 2014/0215621 A1* | 7/2014 | Xaypanya ............. H04L 63/145 726/23 |
| 2014/0292803 A1* | 10/2014 | Cook ...................... G06T 15/00 345/619 |
| 2015/0012589 A1* | 1/2015 | Roseborough .......... H04L 67/06 709/213 |
| 2015/0046676 A1* | 2/2015 | Archibald ............. G06F 9/5083 712/28 |
| 2015/0103754 A1* | 4/2015 | Prokopenko .......... H04W 48/17 370/329 |
| 2015/0188772 A1* | 7/2015 | Gasparakis ............. H04L 41/12 709/224 |
| 2015/0248609 A1* | 9/2015 | Julian .................... G06N 3/082 706/25 |
| 2015/0296659 A1 | 10/2015 | Desiano et al. |
| 2015/0310444 A1* | 10/2015 | Chen .................... G06Q 20/308 705/44 |
| 2015/0371132 A1* | 12/2015 | Gemello ............... H01L 29/785 706/20 |
| 2016/0020674 A1 | 1/2016 | Smaoui et al. |
| 2016/0033204 A1 | 2/2016 | Shedd |
| 2016/0034809 A1* | 2/2016 | Trenholm ............... G06F 18/00 706/20 |
| 2016/0050340 A1* | 2/2016 | Rubio ................... G06F 3/1238 358/1.14 |
| 2016/0066472 A1 | 3/2016 | Cader et al. |
| 2016/0123678 A1 | 5/2016 | Hulse et al. |
| 2016/0164750 A1* | 6/2016 | Holkkola ........... H04L 41/0273 709/203 |
| 2016/0174411 A1 | 6/2016 | Lee et al. |
| 2016/0183407 A1 | 6/2016 | Katsumata et al. |
| 2016/0210550 A1* | 7/2016 | Merrill .................... G06N 3/045 |
| 2016/0210722 A1* | 7/2016 | Fortin .................... A63F 13/30 |
| 2016/0239441 A1* | 8/2016 | Chun .................... G06F 13/18 |
| 2016/0267380 A1* | 9/2016 | Gemello ............... G06N 3/084 |
| 2016/0270251 A1 | 9/2016 | Sugita et al. |
| 2016/0315809 A1* | 10/2016 | McMurry ........... H04L 41/0806 |
| 2017/0011280 A1* | 1/2017 | Soldevila ............. G06V 10/454 |
| 2017/0018050 A1* | 1/2017 | Roy ......................... G06T 1/60 |
| 2017/0032222 A1* | 2/2017 | Sharma ................ G06V 30/194 |
| 2017/0102971 A1* | 4/2017 | Blagodurov .......... G06F 9/5038 |
| 2017/0195173 A1* | 7/2017 | Izenberg ................ G06F 9/5044 |
| 2017/0220949 A1* | 8/2017 | Feng ....................... H04L 41/16 |
| 2017/0256018 A1* | 9/2017 | Gandhi ..................... G06T 1/60 |
| 2017/0315596 A1 | 11/2017 | Torres et al. |
| 2018/0004452 A1* | 1/2018 | Ganguli ............... H04L 41/5025 |
| 2018/0095750 A1* | 4/2018 | Drysdale ................ G06F 9/50 |
| 2018/0277460 A1 | 9/2018 | Suzuki et al. |
| 2019/0073553 A1* | 3/2019 | Yao ........................ G06N 3/082 |
| 2019/0171601 A1* | 6/2019 | Nachimuthu ............ G06F 9/50 |
| 2019/0230046 A1* | 7/2019 | Djukic .................... H04L 47/76 |
| 2020/0042857 A1* | 2/2020 | Fang ...................... G06N 3/084 |
| 2020/0153921 A1* | 5/2020 | Kolluri Venkata Sesha ............... H04L 67/10 |
| 2020/0241929 A1* | 7/2020 | Arrasjid ............. G06F 11/3409 |
| 2020/0364638 A1* | 11/2020 | Molloy ................. G06F 40/284 |
| 2022/0156639 A1* | 5/2022 | da Silva ................ G06N 20/00 |

* cited by examiner

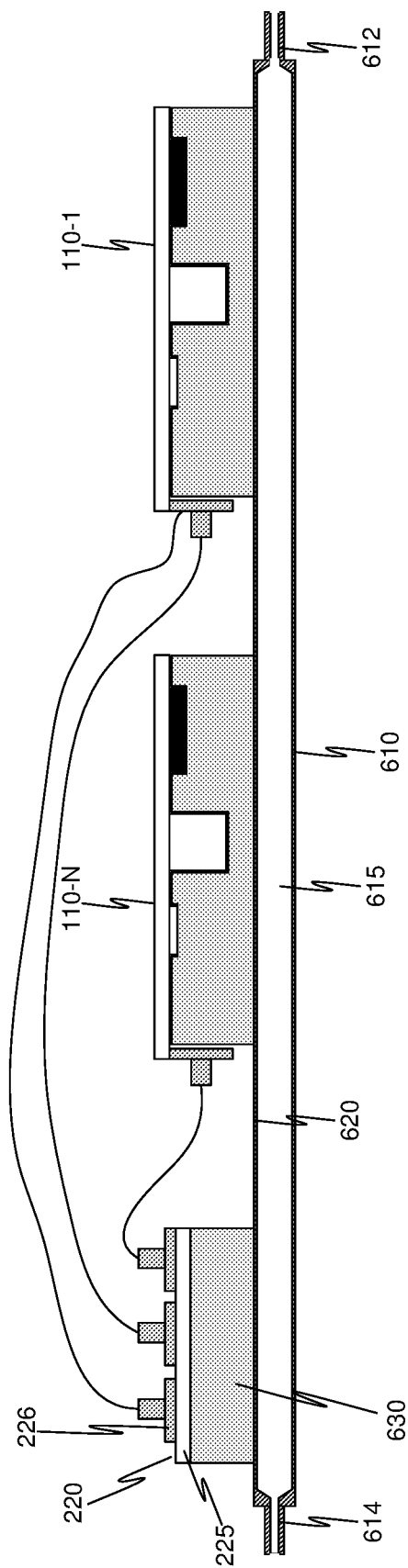

SYSTEM AND METHOD FOR PROVISIONING OF ARTIFICIAL INTELLIGENCE ACCELERATOR (AIA) RESOURCES

CROSS-REFERENCE TO RELATED APPLICATIONS

This application claims the benefit of U.S. Provisional Application No. 62/902,440 filed on Sep. 19, 2019. This application is also a continuation in part of U.S. patent application Ser. No. 16/886,303 filed May 28, 2020. The Ser. No. 16/886,303 application also claims the benefit of U.S. Provisional Application No. 62/853,346 filed on May 28, 2019. The Ser. No. 16/886,303 application is also a CIP of U.S. patent application Ser. No. 16/090,250 filed Sep. 30, 2018, which is a 371 Application of an International Application No. PCT/IL2017/050396 filed Mar. 30, 2017. The PCT/IL2017/050396 Application claims the benefit of a U.S. Provisional Application No. 62/316,048 filed Mar. 31, 2016. The contents of the above-referenced applications are hereby incorporated by reference.

TECHNICAL FIELD

The disclosure generally relates to artificial intelligence accelerators and, particularly, to networking solutions for the same.

BACKGROUND

Artificial neural networks (ANNs) are biologically inspired computational networks. ANNs are often used for a wide variety of problems, are based on a supervised procedure, and comprise three layers: input, hidden, and output. ANNs require computational resources which are often specialized, and not always readily-available to the public. Google Inc.(r), for example, offers a product called Tensor-Flow, which has a dedicated application-specific integrated circuit for the purpose of executing the software library. While such solutions provide a framework to execute ANNs, such solutions may fail to provide an infrastructure or method to further provision computational resources with a goal of advancing ANN execution capability.

It would be, therefore, advantageous to provide solution that would overcome the deficiencies mentioned above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for provisioning of artificial intelligence accelerator (AIA) resources. The method comprises receiving a request for an NPU allocation from a client device; determining an available NPU based on a scanning of a network to discover NPU resources; and allocating the available NPU to the client device.

Certain embodiments disclosed herein also include a neural processing unit (NPU. The NPU comprises a network interface controller connected to at least one client device over a network fabric, wherein the network interface controller is configured to receive instructions from the at least one client device; and an artificial intelligence accelerator (AIA) connected to the network interface controller, wherein the AIA is configure to receive instructions from the network interface controller and execute the received instructions.

Certain embodiments disclosed herein further include an orchestrator for provisioning of artificial intelligence accelerator (AIA) resources. The orchestrator comprises a processing circuitry; and a memory, the memory containing instructions that, when executed by the processing circuitry, configure the orchestrator to: receive a request for an NPU allocation from a client device; determine an available NPU based on a scanning of a network to discover NPU resources; and allocate the available NPU to the client device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 is a cross section view of a schematic illustration of a fluid cooled heat sink unit having a plurality of NPUs and an orchestrator according to an embodiment.

DETAILED DESCRIPTION

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

According to some example embodiments, a neural network processor unit (NPU) is disclosed. The NPU includes an artificial intelligence accelerator (AIA) and a network interface controller (NIC). The NPU connects to a network fabric, over which the NIC provides access to the AIA to various client devices. The AIA may have a pretrained neural network uploaded thereto. In one configuration, a plurality of NPUs may be allocated, including allocation of each device to one or more client devices. Such a scheme provides for provisioning AIA resources to client devices on an as-needed basis.

Figure 1:
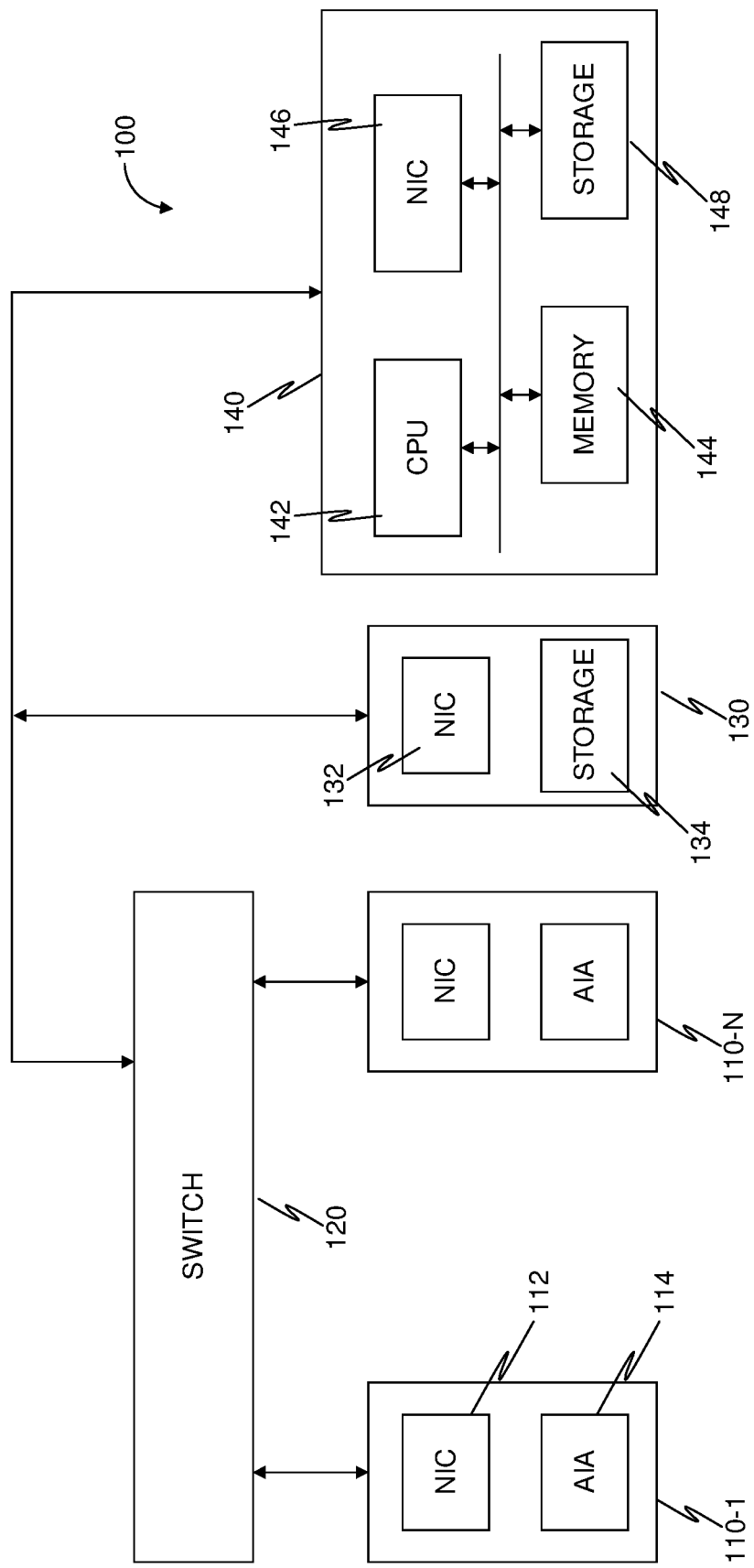
FIG. 1 is a schematic illustration of a network fabric comprising neural processing units, implemented in accordance with an embodiment.

FIG. 1 is a schematic illustration of a network fabric 100 including NPUs, implemented in accordance with an embodiment. A plurality of neural processing units (NPUs) 110-1 through 110-N are coupled with a switch 120. Each NPU 110, such as the NPU 110-1, includes a network interface controller (NIC) 112 and an artificial intelligence accelerator (AIA) 114.

The AIA 114 is a processor designed to provide hardware-level acceleration for processing calculations typical of neural networks, machine learning, and artificial intelligence algorithms. In an embodiment, the AIA 114 may include one or more such processors (or cores). The one or more processors may be implemented with any combination of general-purpose microprocessors, microcontrollers, digital signal processors (DSPs), field programmable gate array (FPGAs), programmable logic devices (PLDs), Application Specific Integrated Circuits (ASICs), graphic processing units (GPUs), controllers, state machines, gated logic, discrete hardware components, dedicated hardware finite state machines, or any other suitable entities that can perform calculations or other manipulations of information.

The NIC 112 is configured to allow the AIA to be accessed over a network fabric, including, for example, via the switch 120. The NIC 112 may further include control logic for controlling the AIA 114. Accessing an AIA over a switch may be advantageous in some embodiments, to other methods of access, such as through a universal serial bus (USB) interface. A network switch is generally capable of providing connectivity to more devices than a USB hub, therefore more AIAs may be connected to a single switch than to a USB hub, in an embodiment. The switch 120 is part of the network fabric and may provide connectivity between the plurality of NPUs 110, a network accessible storage (NAS) 130, and a client device 140. The NAS 130 includes a NIC 132 and a storage device 134. The NAS 130 may be a remote direct memory access (RDMA)-type storage, accessible over the network fabric.

A client device 140 may utilize the resources available in the network, such as the NPUs 110 and the NAS 130. The client device 140 includes a processing element 142, a memory 144, a NIC 146, and a storage 148. In an embodiment, the processing element 142 may be, or may be a component of, a larger processing unit implemented with one or more processors. The one or more processors may be implemented with any combination of general-purpose microprocessors, microcontrollers, DSPs, FPGAs, PLDs, ASICs, GPUs, controllers, state machines, gated logic, discrete hardware components, dedicated hardware finite state machines, or any other suitable entities that can perform calculations or other manipulations of information. The processing element 142 is coupled via a bus 145 to a memory 144.

The memory 144 may include a memory portion (not shown) that contains instructions that, when executed by the processing element 142, perform the methods described in more detail herein. The memory 144 may be further used as a working scratch pad for the processing element 142, as a temporary storage, and for other, like, purposes, as well as any combination thereof. The memory 144 may be a volatile memory such as, without limitation, random access memory (RAM), or non-volatile memory (NVM), such as, without limitation, flash memory.

The processing element 142 may be coupled to a NIC 146. The NIC 146 may provide connectivity for the client device 140, for example, by coupling directly to the switch, or by connecting over a network. In an embodiment, the network, as described in greater detail in FIG. 2 below, may be configured to provide connectivity of various sorts, as may be necessary, including, but not limited to, wired connectivity, wireless connectivity, or both, via one or more means or networks such as, as examples and without limitation, a local area network (LAN), a wide area network (WAN), a metro area network (MAN), the worldwide web (WWW), the Internet, cellular connectivity, and the like, as well as any combination thereof. The processing element 142 may be further coupled with a storage 148. The storage 148 may be used for the purpose of holding a copy of the method executed in accordance with the disclosed techniques.

The processing element 142, the memory 144, or both, may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in greater detail herein. 'N,' as used throughout, is an integer, having a value of '1' or greater.

Figure 2:
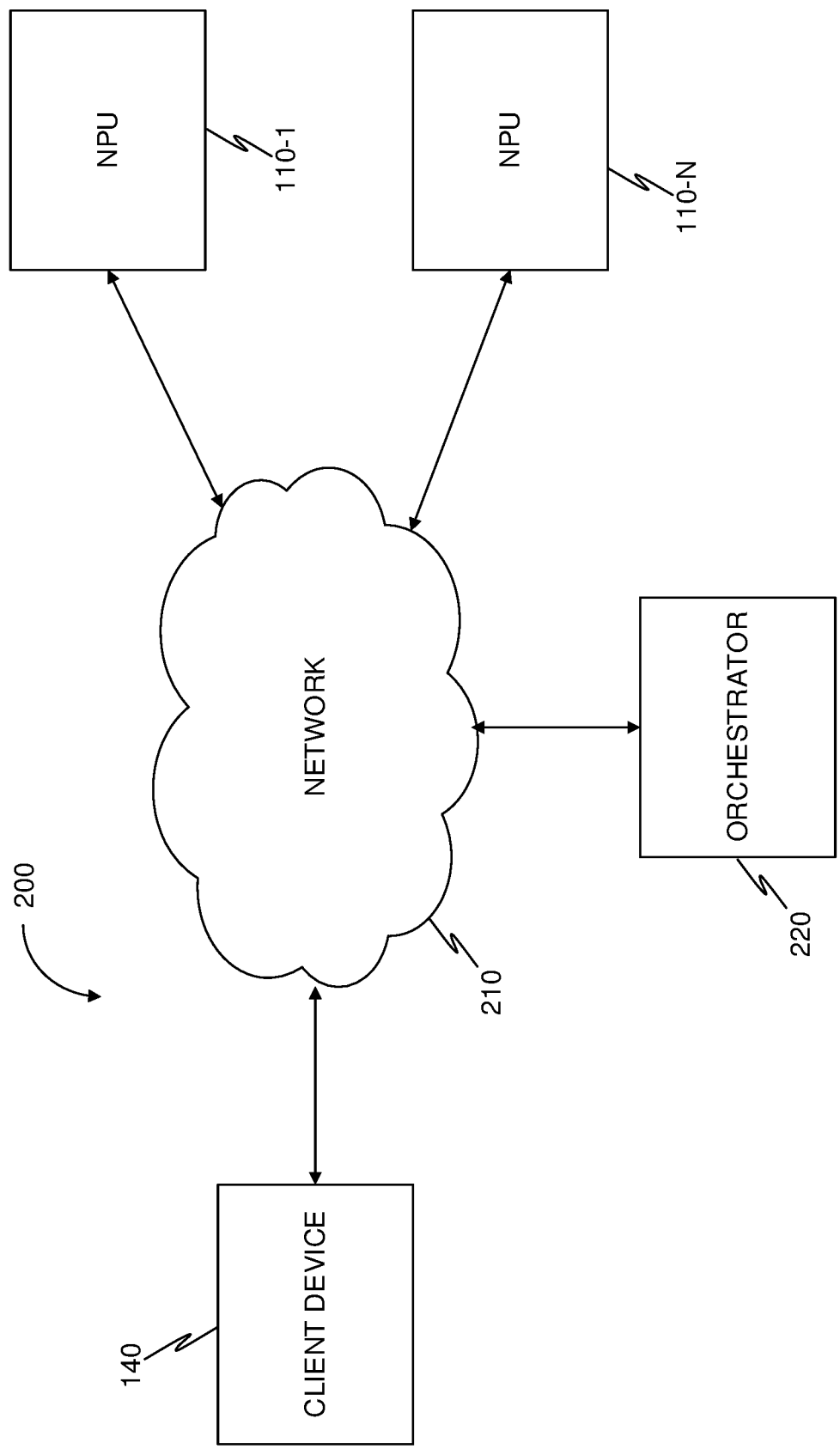
FIG. 2 is a schematic illustration of a network offering neural processor acceleration over a fabric, implemented in accordance with an embodiment.

FIG. 2 is a schematic illustration 200 of a network designed with a neural processor acceleration over a fabric, implemented in accordance with an embodiment. A client device 140, such as the client device of FIG. 1, is communicatively coupled with the network 210 fabric. The network 210 fabric may include, for example, Ethernet, InfiniBand, and the like. The network 210 further provides communication for an orchestrator 220 and a plurality of NPUs, 110-1 through 110-N. The client device 140 may send a request over the network to the orchestrator 220 to allocate the client device 140 with NPU computing power.

The orchestrator 220 may then determine which, if any, of the NPUs communicatively connected thereto can be allocated (either exclusively or not) to the client device 140. In other embodiments, the client device 140 may send the orchestrator 220 a set of instructions to be executed on an NPU 110. The orchestrator 220 may then determine tasks, threads, and the like to be executed, and generate a computing plan which includes instructions specifying on which NPU 110 the tasks, threads, and the like should be executed, how to store and further use the outputs of such instructions, and the like.

The orchestrator 220 may then provide the client device 140 with an output based on the executed set of instructions. In an embodiment, where the orchestrator 220 is configured to allocate an NPU (e.g., NPU 110-1) to the client device 140, the orchestrator 220 may periodically check if the client device 140 still requires the NPU 110-1 allocation. If the orchestrator 220 determines that the client device 140 no longer requires the NPU allocation, the NPU, e.g., NPU 110-1 may be unallocated from the client device 140 and reallocated to the pool of available NPUs. In an embodiment, the orchestrator 220 may allocate one or more NPUs to the client device 140 for the client device to use directly (i.e. not through the orchestrator).

A detailed description of an orchestrator 220, according to an embodiment, is provided with respect to FIG. 5, below. Further, prior to, or concurrently with the execution of the method described with respect to FIG. 3, the orchestrator may be configured to determine, periodically, or at other timeframes, what NPU resources are available. For example, the orchestrator may scan a network to discover NPU resources, or may receive signals broadcast by resources over certain ports, where such signals advertise the resources' availabilities, according to an embodiment.

Figure 3:
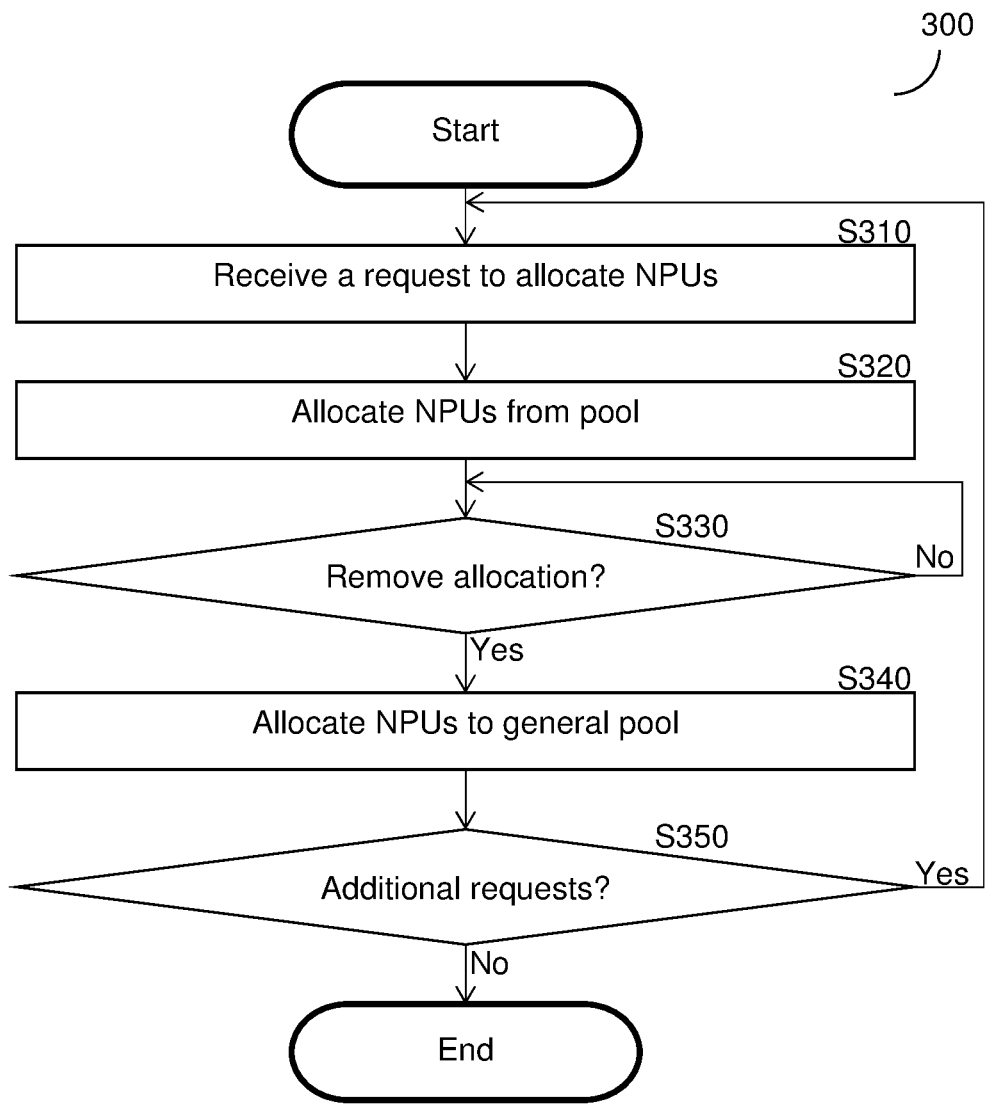
FIG. 3 is a flowchart describing a method for allocating neural processing unit (NPU) resources, implemented in accordance with an embodiment.

FIG. 3 is an example flowchart 300 describing a method for allocating NPUs, implemented in accordance with an embodiment. In an example configuration, the method is performed using the orchestrator, such as the orchestrator 220, of FIG. 2. The orchestrator may be part of, or connected to, a network fabric, or a cloud computing environment, which includes therein a plurality of NPU resources, as detailed above.

At S310, a request is received to allocate one or more NPUs to a client device from which the request originates.

At S320, one or more NPUs are allocated to the client device. The request may include data or metadata indicating to how much computing power the client device requires. Computing power may include processing time, and memory allocation. In response to the request, it is determined what NPUs can or should be allocated to the client device. In some embodiments, different client devices may be assigned specific priorities, according to which resources may be allocated. In other embodiments, a billing table may be utilized to determine which resources to allocate. For example, a less-powerful resource may be billed as 'free', while a more-powerful resource (i.e. higher computing capability) is billed as 'premium' and, therefore, is allocated only if a financial transaction occurred between the client device and a provider of the orchestrator and resources. In an embodiment, the NPU further includes a preloaded neural network model. In an additional embodiment, one or more NPUs or groups of NPUs may be allocated based on one or more client device tiers, NPU tiers, and the like, as well as any combination thereof, where such tiers may be ordered, ranked, or otherwise organized based on one or more factors including, without limitation, administrator or user designation, task type, resource demand, other, like, factors, and any combination thereof. Further, where one or more tiers are determined based on client device status, allocation of NPUs at S320 may further include allocating one or more NPUs by matching client device tiers and NPU tiers.

A preloaded neural network resides in a memory accessible by the NPU and may further be pretrained. It is advantageous, for example, to provide such a model in a case where the client device requires processing which would require significant training of the neural network. For example, an image recognition model may be preloaded (by the client device, the orchestrator, or a combination thereof) to one or more NPUs, where the model is pretrained on a set of certain images or characteristics of images. Thus, each client device which requires access to an image recognition model does not need to train a model 'from scratch,' but can, rather, use a pretrained model, thus reducing the amount of computing resources (and, therefore, time) required. In an embodiment, a client device may be billed for use of an NPU, or an NPU which includes a preloaded neural network model. In such embodiments, billing may be different for each case. In other embodiments, a client device may be billed according to hardware type of the NPU, a speed at which results are expected (a form of "SLA," or service level agreement), and the like, as well as various combinations thereof.

At S330, a check is performed to determine if the allocated NPU(s) should be unallocated from the client device. In some embodiments, this may be an optional step if the client device informs the orchestrator that the use of resources is no longer required, causing the orchestrator to perform the step of S340. If the result of the check is 'yes,' execution continues at S340. Otherwise, execution may pause, and a subsequent check may be performed periodically. In some embodiments, the resources may be unallocated based on a predefined use timeframe, or may be unallocated due to a client device with higher priority requesting to use the resources.

At S340, the NPUs are allocated back to the general pool of NPU resources. This means that the NPU is free for another device to use. In some embodiments, each NPU may also include therein a predefined neural network model. For example, an NPU may have loaded, in a memory thereof, a neural network classifier for facial recognition. In such embodiments, the NPU may be allocated based on the loaded model. For example, if a client device requests access to a facial recognition system, the relevant NPU, having the facial recognition neural network model already loaded therein, may be allocated to the client device. It should be noted that the client device is not required to load a model before using the NPU, which saves time and bandwidth and improves usability.

At S350, a check is performed to determine if additional requests for resources exist. If 'yes,' execution continues at S310, otherwise, execution terminates.

Figure 4:
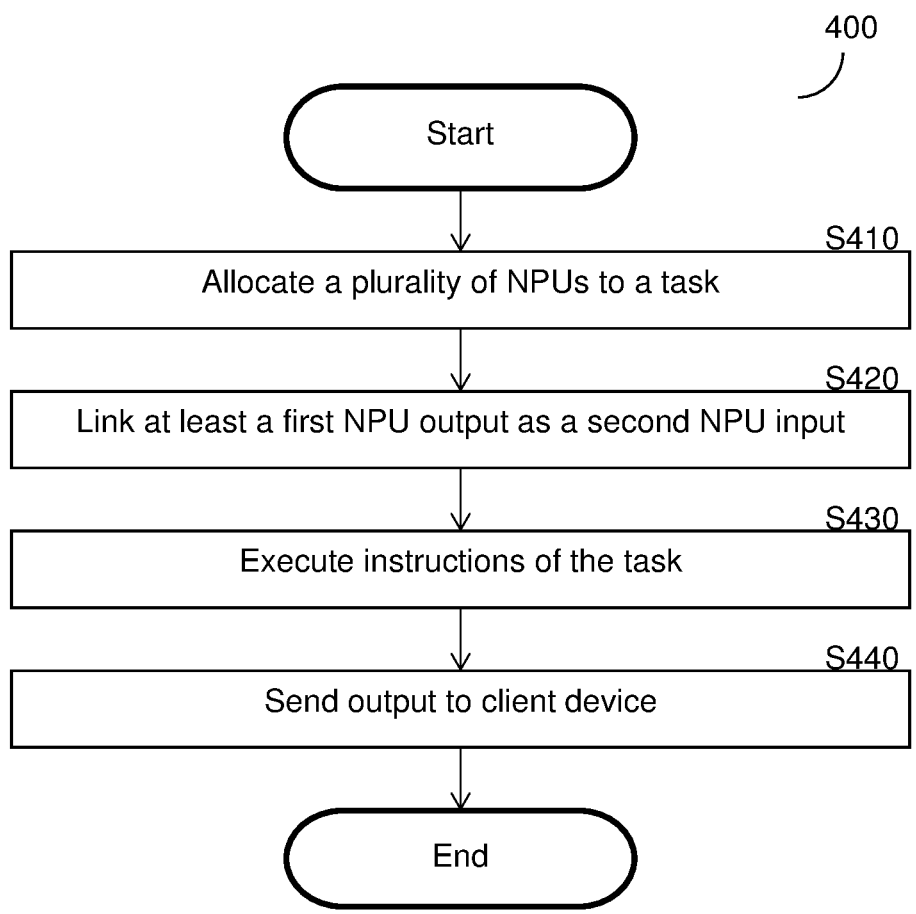
FIG. 4 is a flowchart of a method for allocating a plurality of NPUs to compute a task for a client device in a modular configuration, implemented in accordance with an embodiment.

FIG. 4 is an example flowchart 400 of a method for allocating a plurality of NPUs to compute a task for a client device in a modular configuration, implemented in accordance with an embodiment. In an example configuration, the method is performed using the orchestrator, such as the orchestrator 220, of FIG. 2. The orchestrator may be part of, or connected to, a network fabric, or a cloud computing environment, which includes therein a plurality of NPU resources, as detailed above.

In some embodiments, an orchestrator may determine that the NPUs available in the network do not provide sufficient computing resources. In such embodiments, it may be useful to link the NPUs such that the output of a first NPU serves as the input for a second NPU. By linking NPUs in this way, a deeper neural network may be achieved, with each NPU acting as a group of hidden layers.

At S410, a plurality of NPUs are allocated to perform a task, or are allocated to a client device.

At S420, a first NPU is configured to send an output generated by the first NPU to an input of a second NPU (or group of NPUs). In some embodiments, this linking may continue such that the output of the second NPU (or group of NPUs) is fed as an input for a third NPU (or group of NPUs), and the like.

At S430, the task is executed. For example, in a single NPU per stage configuration, execution includes providing an input for the first NPU, providing the output of the first NPU as input for the second NPU, and providing the output of the second NPU either to the client device (if execution is over), or to the next NPU in the sequence.

At S440, the final output is provided to the client device. In some embodiments, the client device may be unaware that a plurality of NPU resources are linked in this manner to provide a computational result. The methods described herein describe a full provisioning of resources.

Figure 5:
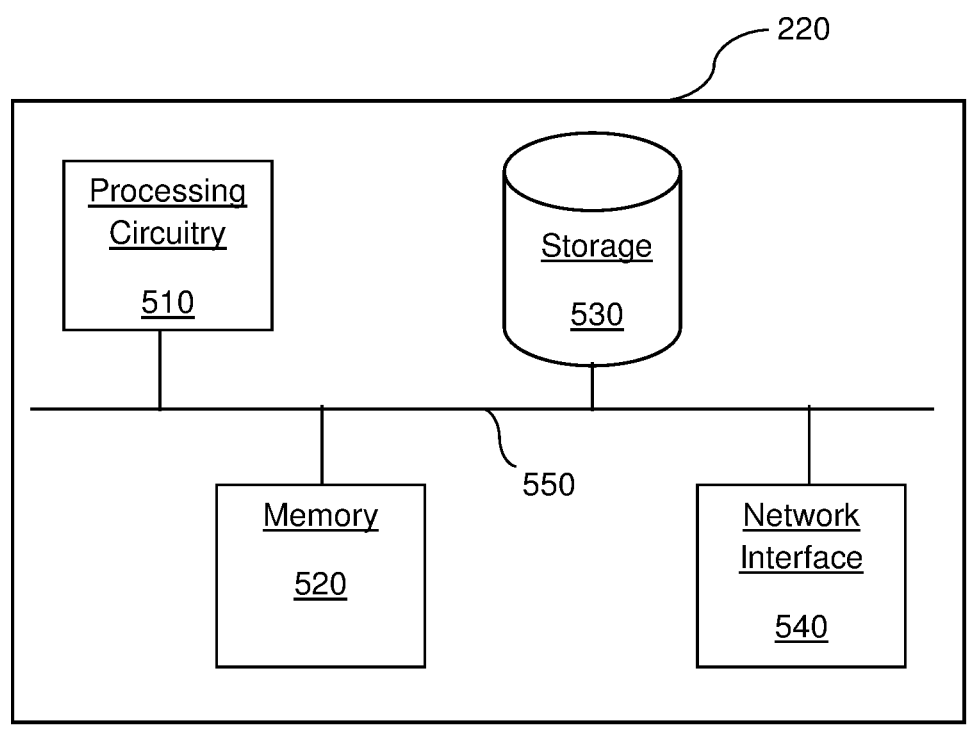
FIG. 5 is an example schematic diagram of an orchestrator, according to an embodiment.

FIG. 5 is an example schematic diagram of an orchestrator 220, according to an embodiment. The orchestrator 220 includes a processing circuitry 510 coupled to a memory 520, a storage 530, and a network interface 540. In an embodiment, the components of the orchestrator 220 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 540 allows the orchestrator 220 to communicate with the various components, devices, and systems described herein for provisioning of artificial intelligence accelerator (AIA) resources, as well as other, like, purposes.

It should be understood that the embodiments described herein are not limited to the specific architecture illustrated in FIG. 5, and other architectures may be equally used without departing from the scope of the disclosed embodiments.

FIG. 6 is a cross section view of a schematic illustration of a fluid cooled heat sink unit having a plurality of NPUs and an orchestrator according to an embodiment. A fluid cooled heatsink is discussed in more detail in U.S. patent application Ser. No. 16/886,303 titled "Cooling Surface Mount for Rack Servers Allowing Modular Resource Configuration", the contents of which are incorporated by reference in their entirety herein.

A fluid cooled heatsink includes a bottom portion 610, and a top portion 620, between which there is a cavity 615. The top portion 620 and bottom portion 610 may be connected by one or more sides (not shown), which support the top portion 620 to remain over the bottom portion. Fluid enters the cavity 615 through an inlet 612 and expelled through an outlet 614. The fluid is in contact with the top portion 620 and heat exchange between the top portion 612 occurs. By providing at the inlet fluid at a temperature which is lower than a temperature of the top portion 620, the top portion 620 may be cooled.

Each component in contact with the heatsink may require a heatsink adapter, such as adapter 630. Adapter 630 has a surface which is in contact with at least one side with an orchestrator 220 (such as described in more detail above) and another surface which is in contact with the top portion 620 of the heatsink. The orchestrator includes a substrate 220 on which various components (such as those discussed in further detail in FIG. 5 above) may be deposited.

The orchestrator may include a plurality of connectors, such as connecter 226 which physically connects the orchestrator to an NPU, such as NPU 110-1.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for provisioning a plurality of neural processing units (NPUs), comprising:
a network interface controller (NIC) connected to at least one client device over a network fabric, wherein the NIC and the network fabric are configured to provide connectivity between the at least one client device and a plurality of NPUs, wherein the NIC is further configured to receive instructions from the at least one client device over the network fabric;
an artificial intelligence accelerator (AIA) directly connected to the NIC without any intervening processor, wherein the AIA is configured to receive the instructions from the NIC and execute the received instructions; and
a memory containing instructions which when executed by a processing circuitry of the system configures the system to:
receive a request for provisioning an NPU of the plurality of NPUs;
receive a signal from an available NPU of the plurality of NPUs;

provision the available NPU to the client device based on the request; and provision, when the available NPU does not provide sufficient resources to satisfy the request, an additional NPU from an NPU tier which matches a client device tier such that an output of the available NPU serves as an input for the additional NPU, wherein the client device tier is based on a status of the client device.

2. The system of claim 1, wherein the NPU is configured to:
connect with an orchestrator over the network fabric.

3. The system of claim 2, further comprising:
receiving a provisioning instruction over the NIC to provision the available NPU to the at least one client device.

4. The system of claim 3, wherein provisioning of the NPU is based on at least one of: a specific priority associated with the at least one client device, and a billing table.

5. The system of claim 1, wherein the AIA is configured to host one or more trained neural network models.

6. The system of claim 5, wherein the trained one or more neural network models are pre-trained neural network models.

7. The non-transitory computer readable medium of claim 1, wherein the NIC includes circuitry for controlling the AIA.

8. An orchestrator comprising:
a processing circuitry; and
a memory containing instructions that, when executed by the processing circuitry, configure the orchestrator to:
receive a request for a neural processing unit (NPU) from a client device;
receive a signal from an available NPU;
provision the available NPU to the client device based on the request; and
when the available NPU does not provide sufficient resources to satisfy the request, provision an additional NPU from an NPU tier which matches a client device tier such that an output of the available NPU serves as an input for the additional NPU, wherein the client device tier is based on a status of the client device, and, wherein the NPU comprises:
a network interface controller (NIC) connected to at least one client device including the client device over a network fabric, wherein the NIC is configured to receive instructions from the at least one client device over the network fabric; and
an artificial intelligence accelerator (AIA) directly connected to the NIC without any intervening processor, wherein the AIA is configured to receive the instructions from the NIC and execute the received instructions.

9. The orchestrator of claim 8, wherein the signal includes at least an NPU availability signal.

10. The orchestrator of claim 9, wherein, based on the received instructions from the at least one client device, a computing plan associated with the orchestrator comprises instructions indicating whether to execute at least one of tasks and threads.

11. The orchestrator of claim 10, wherein the computing plan further comprises at least one of:

instructions specifying storage and use of generated outputs associated with an NPU,
instructions specifying an NPU for execution of the tasks, and
instructions specifying an NPU for execution of the threads.

12. The orchestrator of claim 11, wherein the orchestrator is further configured to:
transmit, to at least one NPU, one or more components of the computing plan.

13. A method comprising:
receiving a request for a neural processing unit (NPU) from a client device;
receiving a signal from an available NPU;
provisioning the available NPU to the client device based on the request; and
when the available NPU does not provide sufficient resources to satisfy the request, provisioning an additional NPU from an NPU tier which matches a client device tier such that an output of the available NPU serves as an input for the additional NPU, wherein the client device tier is based on a status of the client device, and wherein the NPU comprises:
a network interface controller (NIC) connected to at least one client device including the client device over a network fabric, wherein the NIC is configured to receive instructions from the at least one client device over the network fabric; and
an artificial intelligence accelerator (AIA) directly connected to the NIC without any intervening processor, wherein the AIA is configured to receive the instructions from the NIC and execute the received instructions.

14. The method of claim 13, wherein
the signal includes at least an NPU availability signal.

15. The method of claim 13, wherein
provisioning the available NPU is based on at least one of:
a specific priority associated with a client device and a billing table.

16. The method of claim 13, wherein the provisioning the available NPU further comprises:
provisioning the available NPU to the client device for direct use, wherein the direct use includes provisioning the available NPU not through an orchestrator.

17. The method of claim 13, wherein the provisioning the additional NPU further comprises:
provisioning at least a first group of NPUs based on at least a first tier associated with the first group; and
provisioning at least a second group of NPUs based on at least a second tier associated with the second group.

18. The method of claim 13, further comprising:
billing the client device for use of the available NPU and the additional NPU.

19. The method of claim 18,
wherein the billing is based on at least one of: a hardware type of the available NPU and the additional NPU, and a service level agreement.

20. The method of claim 13, wherein the request comprises:
data or metadata indicating how much computing power the client device requires.

* * * * *